United States Patent
Plante

(10) Patent No.: US 8,387,014 B2
(45) Date of Patent: *Feb. 26, 2013

(54) SYNCHRONIZATION OF CONCURRENTLY MODIFIED INTERDEPENDENT SEMI-DERIVED ARTIFACTS

(75) Inventor: Frederic Plante, Chelsea (CA)

(73) Assignee: International Business Machines Corporation, Armonk, NY (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/886,824

(22) Filed: Sep. 21, 2010

(65) Prior Publication Data

US 2011/0010687 A1    Jan. 13, 2011

Related U.S. Application Data

(63) Continuation of application No. 10/849,294, filed on May 19, 2004, now Pat. No. 7,856,621.

(51) Int. Cl.
*G06F 9/44* (2006.01)
(52) U.S. Cl. ......... 717/122; 717/104; 717/109; 717/121
(58) Field of Classification Search ............... None
See application file for complete search history.

(56) References Cited

U.S. PATENT DOCUMENTS

| | | | | |
|---|---|---|---|---|
| 5,884,081 A * | 3/1999 | Burbeck | ............... | 717/128 |
| 5,918,053 A * | 6/1999 | Graham | ............... | 717/127 |
| 6,018,627 A | 1/2000 | Lyengar et al. | | |
| 6,035,121 A | 3/2000 | Chiu et al. | | |
| 6,199,198 B1 * | 3/2001 | Graham | ............... | 717/105 |
| 6,502,239 B2 | 12/2002 | Zgarba et al. | | |
| 6,678,882 B1 * | 1/2004 | Hurley et al. | ............... | 717/121 |
| 6,681,382 B1 * | 1/2004 | Kakumani et al. | ............ | 717/122 |
| 6,804,686 B1 | 10/2004 | Stone et al. | | |
| 6,851,105 B1 | 2/2005 | Coad et al. | | |
| 6,851,107 B1 | 2/2005 | Coad et al. | | |
| 6,993,759 B2 * | 1/2006 | Aptus et al. | ................ | 717/170 |
| 7,131,112 B1 * | 10/2006 | Bartz et al. | ................ | 717/122 |
| 7,404,175 B2 * | 7/2008 | Lee et al. | ................ | 717/104 |
| 7,500,224 B2 * | 3/2009 | Hejlsberg et al. | ............ | 717/122 |
| 2002/0147763 A1 | 10/2002 | Lee et al. | | |
| 2004/0034846 A1 | 2/2004 | Ortal et al. | | |
| 2005/0044527 A1 * | 2/2005 | Recinto | ................ | 717/109 |
| 2005/0044530 A1 * | 2/2005 | Novik | ................ | 717/122 |
| 2005/0193374 A1 * | 9/2005 | Harry et al. | ................ | 717/122 |
| 2006/0206866 A1 * | 9/2006 | Eldrige et al. | ................ | 717/122 |

OTHER PUBLICATIONS

Farhad Arbab, The IWIM Model for Coordination of Concurrent Activities, published by SpringerLink, 1996, pp. 34-56.*
Munson et al., Sync: A Java Framework for MObile Collaborative Applications, publihsed by IEEE 1997, pp. 59-66.*

* cited by examiner

*Primary Examiner* — Tuan Q Dam
*Assistant Examiner* — Zheng Wei
(74) *Attorney, Agent, or Firm* — Guerin & Rodriguez, LLP

(57) ABSTRACT

Described is a method for synchronizing interdependent artifacts that are each modified independent of a modification to the other artifact after a last synchronization. Each artifact has a plurality of elements and is of a different formant from the other artifact. The method includes generating a temporary artifact having all the elements of a last synchronized version of the first artifact and having all the elements of a latest version of the second artifact transformed as the first artifact. The temporary artifact is merged with a latest version of the first artifact to create a synchronized version of the first artifact. A synchronized version of the second artifact having all the elements of the latest version of the second artifact and having all the elements of the synchronized version of the first artifact transformed as the second artifact is generated.

18 Claims, 5 Drawing Sheets

US 8,387,014 B2

SYNCHRONIZATION OF CONCURRENTLY MODIFIED INTERDEPENDENT SEMI-DERIVED ARTIFACTS

CROSS-REFERENCE TO RELATED APPLICATIONS

This application is a continuation application claiming priority to U.S. patent application Ser. No. 10/849,294, filed May 19, 2004, now U.S. Pat. No. 7,856,621, titled "Method for Synchronization of Concurrently Modified Interdependent Semi-Derived Artifacts," the entirety of which is incorporated by reference herein.

FIELD OF THE INVENTION

The invention relates generally to the synchronization of concurrently modified semi-derived artifacts. In particular, the invention relates to the modeling of computer systems software.

BACKGROUND

As computer systems software becomes more complex, software analysts and architects often rely on models to represent the software. Tools have been developed to operate on a model of the software to generate the software code (e.g., Java, C++). The model may be created, for example, using Unified Modeling Language (UML). The software model and the generated code exist as files or "artifacts". Code is generated from the software model in a forward engineering operation. The code can be modified and a reverse engineering operation can be used to update the software model to account for the code modifications.

In a common scenario, a software model is developed and code is then generated from the model. Subsequently, the code is modified and then the software model is transformed according to the intervening changes in the code. This process is repeated until the final code version is achieved. However, if the software model and the code are modified in parallel (i.e., concurrently), changes made to the software model can conflict with changes made to the code. Similarly, changes made to the code can conflict with changes made to the software model. Consequently, reconciliation of the software model and the code may require user intervention. To accommodate potential conflicts, annotations are typically added for objects specified in the software model to track whether the objects have been modified in the software model or in the code. This extra tracking information results in more complex and costly modeling implementations.

What is needed is a method to synchronize concurrently modified artifacts without having to maintain annotation information for each object. The present invention satisfies this need and provides additional advantages.

BRIEF SUMMARY

In one aspect, the invention features a method for synchronizing a first and a second artifact. The first and second artifacts are interdependent and each artifact is modified independent of a modification to the other artifact after a last synchronization. Each of the artifacts has a plurality of elements and is a different format from the other artifact. Embodiments of the method include generating a temporary artifact having all the elements of a last synchronized version of the first artifact and having all the elements of a latest version of the second artifact transformed as the first artifact. The temporary artifact and a latest version of the first artifact are merged to create a synchronized version of the first artifact. A synchronized version of the second artifact having all the elements of the latest version of the second artifact and having all the elements of the synchronized version of the first artifact transformed as the second artifact is generated.

In another aspect, the invention features a computer program product for synchronizing a first artifact and a second artifact. The computer program product includes a computer readable storage medium that has computer readable program code embodied therewith for processing a first and a second artifact that are interdependent. Each artifact is modified independent of a modification to the other artifact after a last synchronization. Each artifact has a plurality of elements and is in a different format from the other artifact. In various embodiments, the computer readable program code includes program code for generating a temporary artifact having all the elements of a last synchronized version of the first artifact and having all the elements of a latest version of the second artifact transformed as the first artifact. In these embodiments, the computer readable program code also includes program code for merging the temporary artifact and a latest version of the first artifact to create a synchronized version of the first artifact, and program code for generating a synchronized version of the second artifact having all the elements of the latest version of the second artifact and having all the elements of the synchronized version of the first artifact transformed as the second artifact.

In another aspect, the invention features an apparatus for synchronizing a first artifact and a second artifact. The first and second artifacts are interdependent and each artifact is modified independent of a modification to the other artifact after a last synchronization. Each artifact has a plurality of elements and is in a different format from the other artifact. Embodiments of the apparatus include means for generating a temporary artifact having all the elements of a last synchronized version of the first artifact and having all the elements of a latest version of the second artifact transformed as the first artifact. These embodiments of the apparatus also includes means for merging the temporary artifact and a latest version of the first artifact to create a synchronized version of the first artifact, and means for generating a synchronized version of the second artifact having all the elements of the latest version of the second artifact and having all the elements of the synchronized version of the first artifact transformed as the second artifact.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the present invention relates to a method for synchronizing concurrently modified interdependent semi-derived artifacts (SDAs). A combination of reverse engineering, forward engineering and merge operations are used to synchronize the SDAs. Advantageously, annotation of individual elements of the artifacts is not required. Only the last synchronized version of each artifact is tracked. The synchronization operation does not require any logic to manage conflicts and to ensure artifact semantic consistency. Instead, existing merge tools which have the capability to handle semantic consistency are used. Moreover, conflicts are resolved using the merge tool user interface (UI) without the need to provide a synchronization-specific UI.

As used herein, an SDA means an artifact (i.e., file) that is generated in part through a transformation and in part through direct editing. For example, a third-generation language (3GL) code file (e.g., Java file) can be generated from a software modeling tool (e.g., UML) and then edited by a programmer. A forward engineering tool operates on the primary artifact to generate the SDA. In the example, the software model is the primary artifact, the forward engineering tool applies the transformation, and the 3GL code is the SDA.

A primary artifact can also be an SDA. In another example, a software model and a 3GL code file are used in a "round trip" engineering workflow. When a forward engineering operation is used, the software model is the primary artifact and the 3GL code file is the SDA. Conversely, when a reverse engineering operation is used, the 3GL code file is the primary artifact and the software model is the SDA. Stated otherwise, the software model is "linked" with the 3GL code file as primary artifact and SDA, or SDA and primary artifact, depending on the particular engineering operation applied. Thus the software model and the 3GL file are interdependent SDAs.

Figure 1:
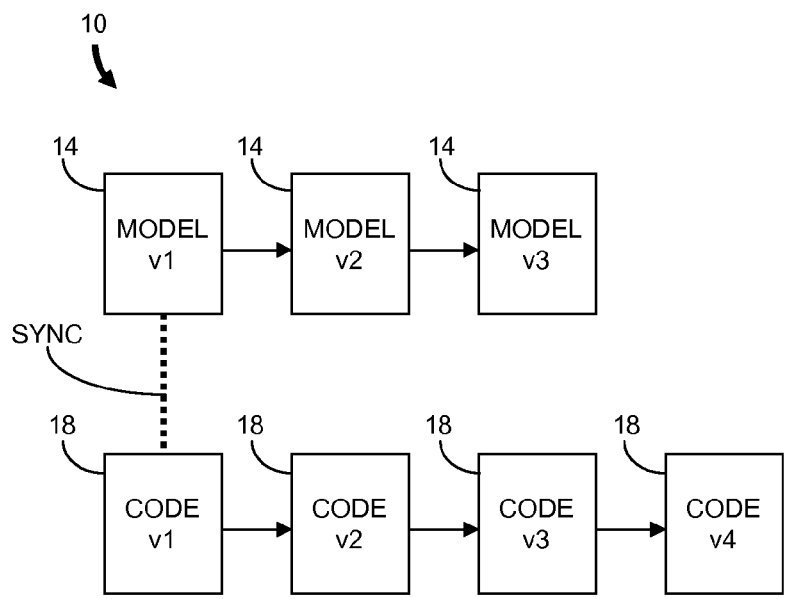
FIG. 1 is an illustration of sequential version generation of a software model artifact and a code artifact.

FIG. 1 is an example of a software development system 10 in which interdependent software model and code artifacts 14 and 18, respectively, are concurrently modified. Each artifact 14, 18 is shown with a corresponding version number vn in which n represents the version in the sequence. A source control management (SCM) system tracks the artifact versions and links the synchronized versions. Version v1 of both the software model and code artifacts 14, 18 are shown as synchronized, thus any synchronization operation applied to these versions does not result in changes to the artifacts 14, 18. Subsequently, both the software model artifact 14 and the code artifact 18 are independently modified. In this example, the software model artifact 14 is modified twice, resulting in model versions v2 and v3, and the code artifact 18 is modified three times, resulting in code versions v2, v3 and v4.

Figure 2:
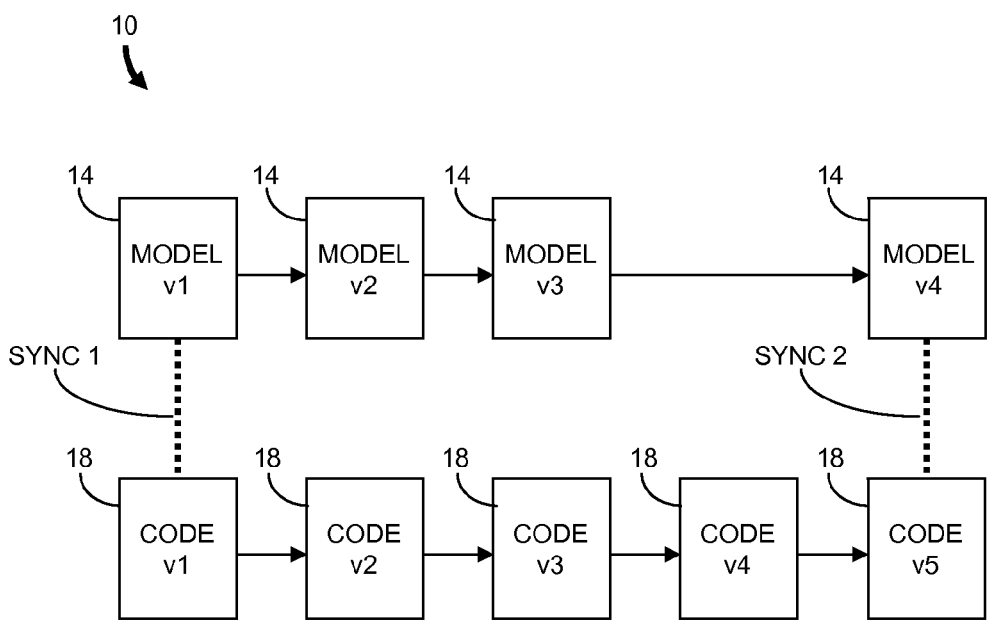
FIG. 2 is an illustration of a synchronization of a software model artifact and a code artifact based on conventional element annotation.

A synchronization operation is utilized to achieve a state in which the modifications made to the artifacts 14, 18 are reflected in the dependent artifacts 18, 14 so that the system 10 is again consistent as shown in FIG. 2. Typically, tools manage any conflicts that can arise during the synchronization operation by maintaining modification information (i.e., annotations) for each element in the artifact 14, 18 that is potentially affected by synchronization. Unfortunately, associating annotations with the elements results in a significant increase to the size of the artifact 14, 18 and, consequently, an increase in cost to the development system 10.

Figure 3:
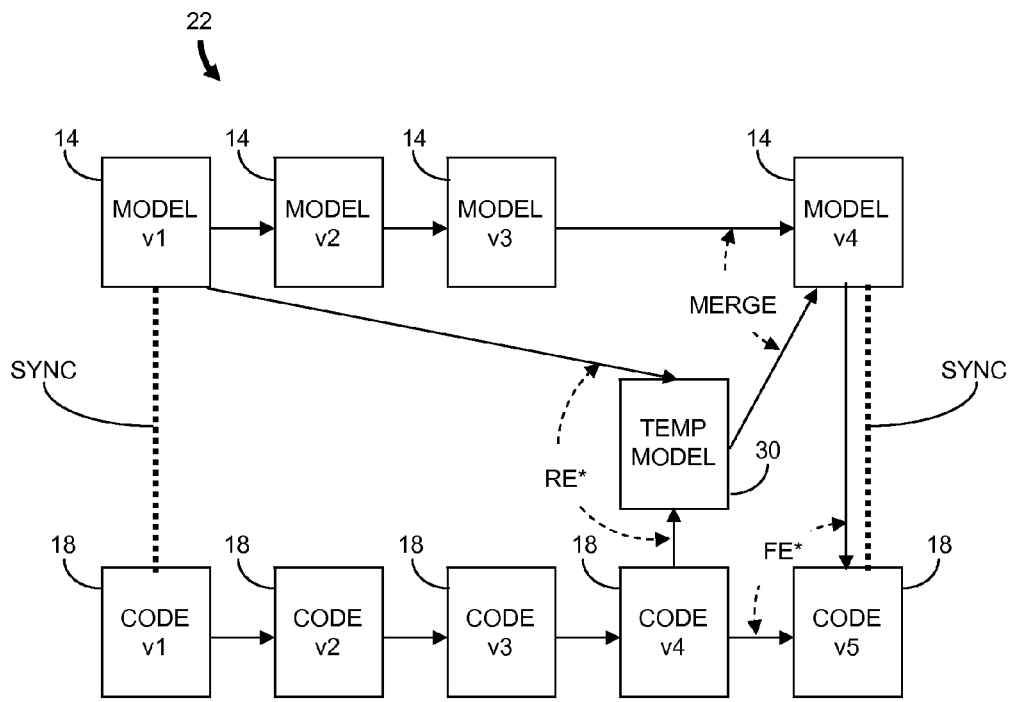
FIG. 3 is a functional block diagram depicting the synchronization of concurrently modified software model and code artifacts in accordance with the invention.
Figure 4:
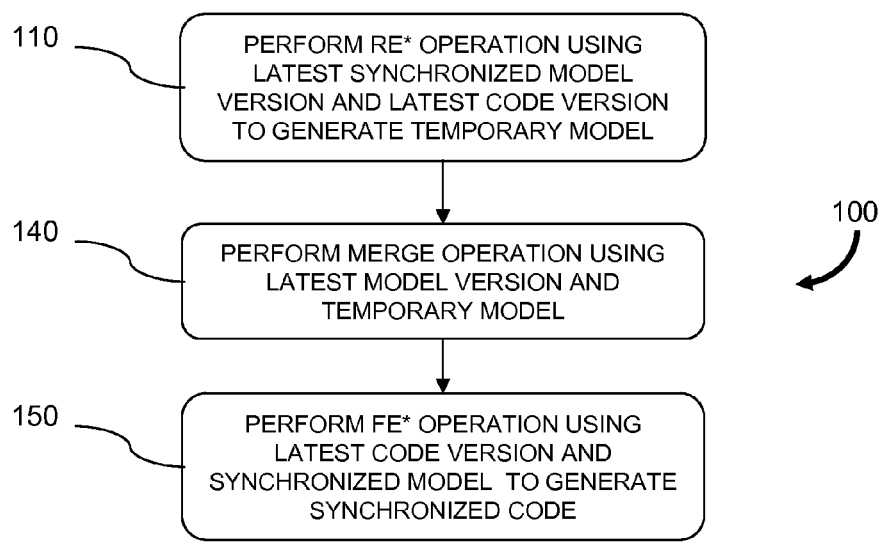
FIG. 4 is a flowchart representation of an embodiment of a method for synchronizing concurrently modified software model and code artifacts in accordance with the invention.

FIG. 3 illustrates an example of a software development system 22 based on an embodiment of the synchronization method of the invention as depicted in the flowchart of FIG. 4. An artifact 14, 18, 30 at the source end of an arrow is an input to an operation generating the artifact 14, 18, 30 at the arrowhead. Dashed, curved arrows identify the artifacts 14, 18, 30 representing the inputs and output associated with each operation. The synchronization uses the latest synchronized model (model v1), the latest model version (model v3) and the latest code version (code v4) as input artifacts. Applying the three illustrated operations RE*, MERGE and FE* (described below) according to the method 100 results in a synchronized software model (model v4) and a synchronized code (code v5).

The method 100 includes performing (step 110) a modified reverse engineering operation RE* using the latest synchronized model (software model v1) and the latest code (code v4) as input artifacts and produces a temporary model 30 as an output artifact. The modified reverse engineering operation RE* differs from a standard reverse engineering operation in that it does not recreate the target artifact from scratch but modifies a copy of the source artifact. Consequently, non-derived data is preserved in the temporary model 30.

Figure 5:
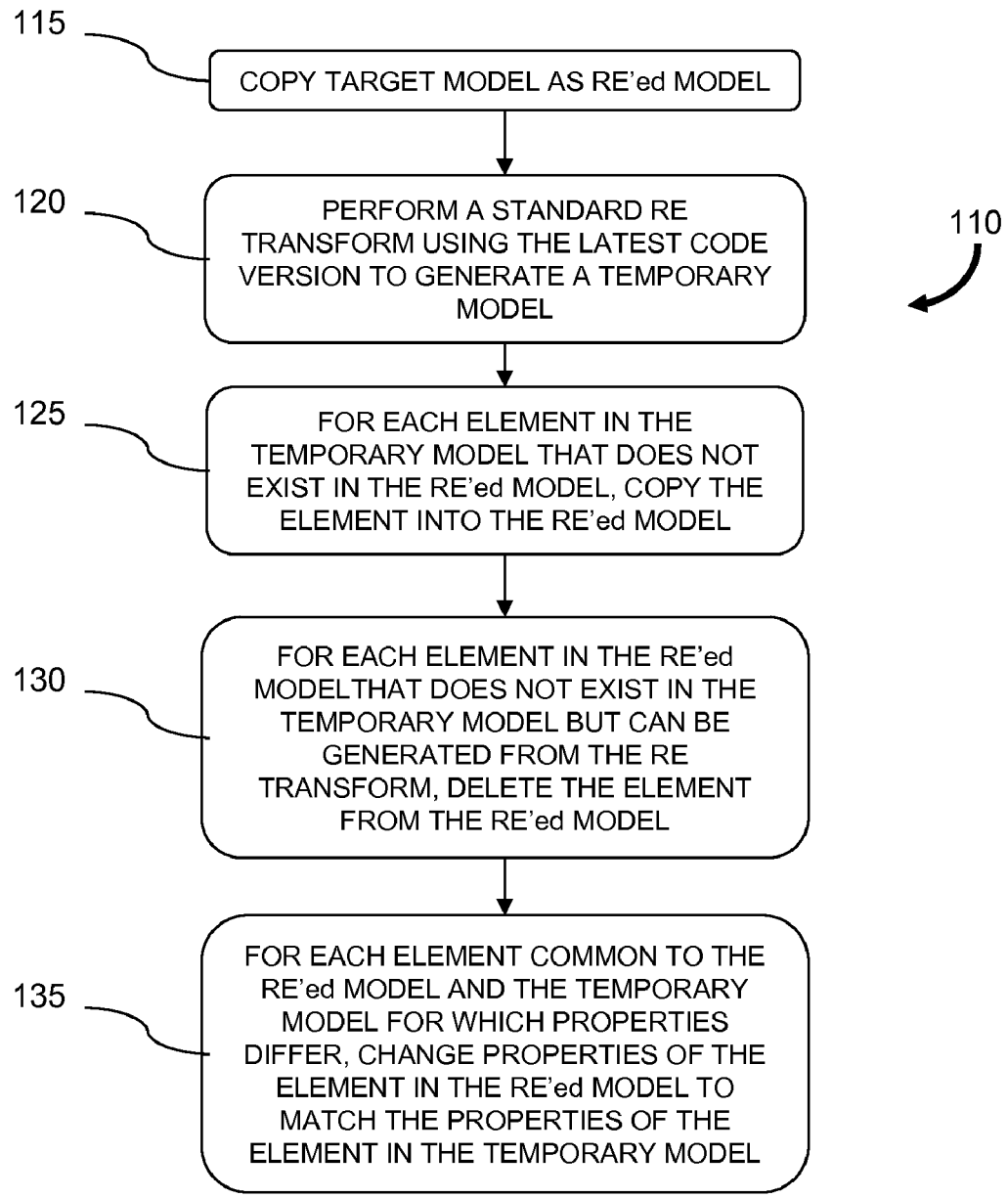
FIG. 5 is a flowchart representation of an embodiment of a reverse engineering operation in accordance with the invention.

FIG. 5 illustrates the modified reverse engineering operation RE* 110 in more detail. According to the example, a reverse engineering model is created by copying (step 115) the target model (model v1). A conventional reverse engineering operation is performed (step 120) using the latest code version (code v4) to generate the temporary model 30. Each element in the temporary model 30 that is not in the reverse engineering model is copied (step 125) into the reverse engineering model. Each element in the reverse engineering model that is not in the temporary model 30 but can be generated from the reverse engineering operation is deleted (step 130) from the reverse engineering model. There can be common elements in the reverse engineering model and the temporary model 30 but the properties of such elements can differ. The properties of such elements in the reverse engineering model are changed (step 135) to be the same as the properties of the corresponding elements in the temporary model 30.

Referring again to FIG. 3 and FIG. 4, the method 100 also includes performing (step 140) a merge operation MERGE on the latest model version (model v3) and the temporary model 30 to generate a merged model (model v4). The merge operation MERGE can be performed on the two model artifacts (model v3 and temporary model 30) by existing merge tools to reconcile any conflicts. Merge tools also exist for merging code artifacts and can be used, for example, in another embodiment of the invention as described below for FIG. 7.

The method 100 continues by performing (step 150) a modified forward engineering operation FE* using the latest code version (code v4) and the newly created synchronized software model (model v4) as input artifacts. The result of the forward engineering operation FE* is a synchronized code (code v5). Thus the software model v4 and code v5 are synchronized to each other and account for changes that were made independently and concurrently to the artifacts 14, 18 since the previous synchronization for versions v1.

Figure 6:
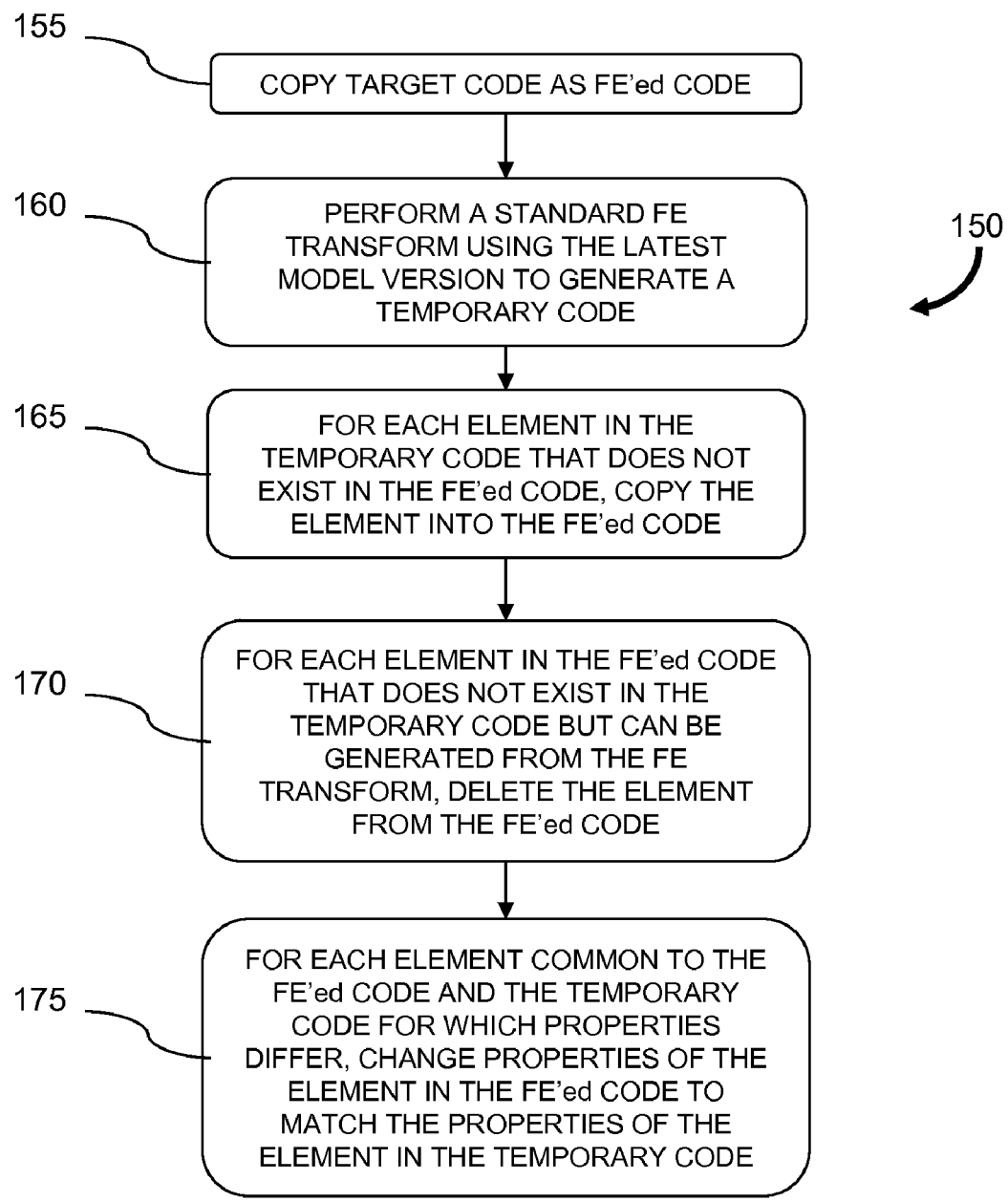
FIG. 6 is a flowchart representation of an embodiment of a forward engineering operation in accordance with the invention.

FIG. 6 illustrates the modified forward engineering operation FE* 150 in more detail. According to the example, a forward engineering code is created by copying (step 155) the target code (code v4). A standard forward engineering operation is performed (step 160) using the latest model version (code v4) to generate a temporary code. Each element in the temporary code that is not in the forward engineering code is copied (step 165) into the forward engineering code. Each element in the forward engineering code that is not in the temporary code but can be generated from the forward engineering operation is deleted (step 170) from the forward engineering code. If the properties of elements common the forward engineering code and the temporary code differ, the properties of the elements in the forward engineering code are changed (step 175) to be the same as the properties of the corresponding elements in the temporary code.

Figure 7:
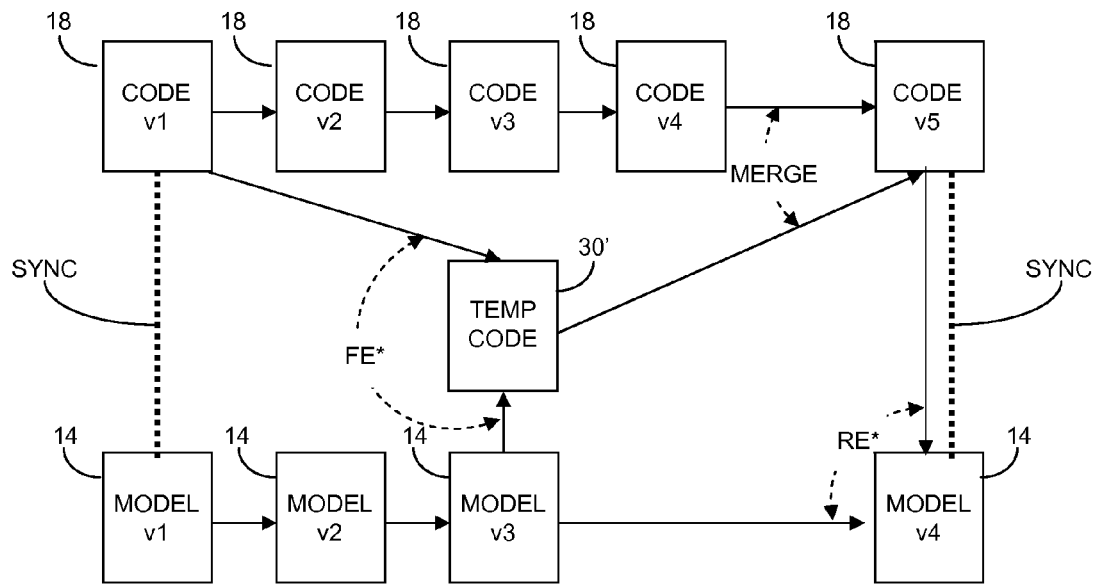
FIG. 7 is a flowchart representation of another embodiment of a method for synchronizing concurrently modified software model and code artifacts in accordance with the invention.

Although the above example of a synchronization method 100 for the software development system 22 shown in FIG. 3 uses the latest synchronized model (model v1), the latest model version (model v3) and the latest code version (code v4) as input artifacts, a complementary method for synchronization is also contemplated. Referring to FIG. 7, the sequential development of software model and code artifacts 14, 18 are the same as described above, however, the modified reverse engineering operation RE* and modified forward engineering operation FE* are applied in reversed order, and the merge operation MERGE is applied to code artifacts 18. This alternative embodiment of the method of the invention can be favored, for example, if the preferred merge tool is adapted for merging code.

Figure 8:
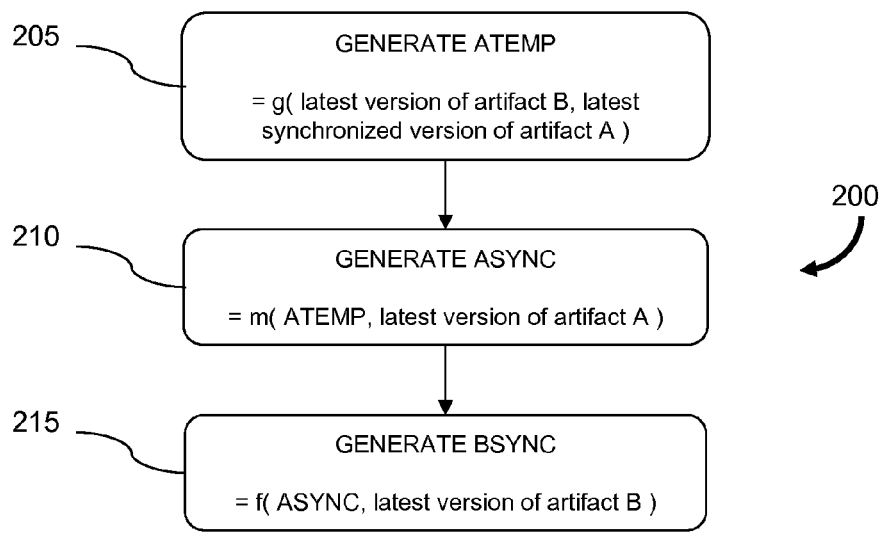
FIG. 8 is a flowchart representation of an embodiment of a method for synchronizing concurrently modified semi-derived artifacts in accordance with the invention.

The embodiments described above are intended for the development of software models and code, however, the method for synchronization according to the invention can be generalized to any two interdependent semi-derived artifacts A and B as depicted in FIG. 8. Examples of interdependent semi-derived artifacts, other than model and code artifacts, include models used to generate other models, code used to generate other code, hyper text markup language (HTML) generated from a word processor document, and Javadoc and Java code.

According to the generalized method 200, a first transformation function f given by $$f(a,b): A \times B \to B$$

generates an artifact of type B that contains all the elements of b that are independent of a and all the elements of a transformed as B. The modified forward engineering operation FE* described above is one example of the first transformation function f. A second transformation function g given by $$g(b,a): B \times A \to A$$

generates an artifact of type A that contains all the elements of a that are independent of b and all the elements of b transformed as A. The modified reverse engineering operation RE* described above is one example of the second transformation function g. A merge operation m given by $$m(a_1, a_2): A \times A \to A$$

generates an artifact of type A that contains a merge of elements from $a_1$ and $a_2$.

The method 200 includes generating (step 205) a temporary artifact ATEMP by applying the second transformation g to the latest version of artifact B and the latest synchronized version of artifact A. A synchronized artifact ASYNC of type A is then generated (step 210) by performing the merge operation on the temporary artifact of type A and the latest version of the artifact of type A. A synchronized artifact BSYNC of type B is generated (step 215) by applying the first transformation f to the synchronized artifact of type A and the latest version of the artifact of type B. Artifacts ASYNC and BSYNC are synchronized to each other and account for the concurrent modifications performed on either artifact type since the previous synchronization.

While the invention has been shown and described with reference to specific embodiments, it should be understood by those skilled in the art that various changes in form and detail may be made therein without departing from the spirit and scope of the invention.

The invention claimed is:

1. A computer program product for synchronizing a first artifact and a second artifact, the computer program product comprising:
a non-transitory computer readable storage medium having computer readable program code embodied therewith for processing a first and a second artifact that are interdependent, each artifact being modified independent of a modification to the other artifact after a last synchronization, the first and second artifacts each having a plurality of elements and being of different formats, the computer readable program code comprising:
program code for generating a temporary artifact having all the elements of a last synchronized version of the first artifact and having all the elements of a latest version of the second artifact transformed as the first artifact;
program code for merging the temporary artifact and a latest version of the first artifact to create a synchronized version of the first artifact; and
program code for generating a synchronized version of the second artifact having all the elements of the latest version of the second artifact and having all the elements of the synchronized version of the first artifact transformed as the second artifact.

2. The computer program product of claim 1 wherein one of the first and second artifacts is a software model artifact and the other of the first and second artifacts is a code artifact.

3. The computer program product of claim 2 wherein the software model artifact is a Unified Modeling Language file.

4. The computer program product of claim 2 wherein the code artifact is a third-generation language source file.

5. The computer program product of claim 1 wherein one of the first and second artifacts is a hypertext markup language file and the other of the first and second artifacts is a word processor document.

6. The computer program product of claim 1 wherein the program code for generating a temporary artifact having all the elements of a last synchronized version of the first artifact and having all the elements of a latest version of the second artifact transformed as the first artifact comprises program code for performing a reverse engineering operation.

7. The computer program product of claim 1 wherein the program code for generating a synchronized version of the second artifact having all the elements of the latest version of the second artifact and having all the elements of the synchronized version of the first artifact transformed as the second artifact comprises program code for performing a forward engineering operation.

8. An apparatus for synchronizing a first artifact and a second artifact, the first and second artifacts being interdependent and each artifact being modified independent of a modification to the other artifact after a last synchronization, the first and second artifacts each having a plurality of elements and being of different formats, the apparatus comprising:
    means for generating a temporary artifact having all the elements of a last synchronized version of the first artifact and having all the elements of a latest version of the second artifact transformed as the first artifact;
    means for merging the temporary artifact and a latest version of the first artifact to create a synchronized version of the first artifact; and
    means for generating a synchronized version of the second artifact having all the elements of the latest version of the second artifact and having all the elements of the synchronized version of the first artifact transformed as the second artifact.

9. The apparatus of claim 8 wherein one of the first and second artifacts is a software model artifact and the other of the first and second artifacts is a code artifact.

10. The apparatus of claim 8 wherein the means for generating a temporary artifact comprises means for performing a reverse engineering operation.

11. The apparatus of claim 8 wherein the means for generating a synchronized version of the second artifact comprises means for performing a forward engineering operation.

12. A method for synchronizing a first artifact and a second artifact, the first and second artifacts being interdependent and each artifact being modified independent of a modification to the other artifact after a last synchronization, the first and second artifacts each having a plurality of elements and being of different formats, the method comprising:
    generating a temporary artifact having all the elements of a last synchronized version of the first artifact and having all the elements of a latest version of the second artifact transformed as the first artifact;
    merging the temporary artifact and a latest version of the first artifact to create a synchronized version of the first artifact; and
    generating a synchronized version of the second artifact having all the elements of the latest version of the second artifact and having all the elements of the synchronized version of the first artifact transformed as the second artifact.

13. The method of claim 12 wherein one of the first and second artifacts is a software model artifact and the other of the first and second artifacts is a code artifact.

14. The method of claim 13 wherein the software model artifact is a Unified Modeling Language file.

15. The method of claim 13 wherein the code artifact is a third-generation language source file.

16. The method of claim 12 wherein one of the first and second artifacts is a hypertext markup language file and the other of the first and second artifacts is a word processor document.

17. The method of claim 12 wherein the generation of a temporary artifact comprises performing a reverse engineering operation.

18. The method of claim 12 wherein the generation of a synchronized version of the second artifact comprises performing a forward engineering operation.

* * * * *